(12) United States Patent
Krishnamurthy

(10) Patent No.: US 6,928,954 B2
(45) Date of Patent: Aug. 16, 2005

(54) AUTOMATIC PET WATERER

(76) Inventor: S. Krishnamurthy, 7NO23 Bristol Ct., St. Charles, IL (US) 60175

( * ) Notice: Subject to any disclaimer, the term of this patent is extended or adjusted under 35 U.S.C. 154(b) by 19 days.

(21) Appl. No.: 10/692,356

(22) Filed: Oct. 23, 2003

(65) Prior Publication Data

US 2004/0118356 A1 Jun. 24, 2004

Related U.S. Application Data

(60) Provisional application No. 60/420,962, filed on Oct. 24, 2002.

(51) Int. Cl.[7] ............................................. A01K 39/00
(52) U.S. Cl. ...................................... 119/51.5; 119/72
(58) Field of Search ............................... D30/129, 131, D30/121, 132, 133; 119/51.01, 51.5, 52.1, 72, 72.5, 74, 75, 77, 78, 79, 80; 206/562, 564; 222/185.1, 457

(56) References Cited

U.S. PATENT DOCUMENTS

| | | | |
|---|---|---|---|
| 4,840,143 A | 6/1989 | Simon | |
| 5,259,336 A | * 11/1993 | Clark | 119/51.5 |
| 5,799,609 A | 9/1998 | Burns et al. | |
| 5,842,437 A | 12/1998 | Burns | |
| D406,924 S | 3/1999 | Kolozsvari | |
| 6,079,361 A | * 6/2000 | Bowell et al. | 119/72 |
| 6,460,483 B1 | 10/2002 | Northrop et al. | |
| 6,622,657 B2 | * 9/2003 | Northrop et al. | 119/74 |

* cited by examiner

Primary Examiner—T. Nguyen
(74) Attorney, Agent, or Firm—Cook, Alex, McFarron, Manzo, Cummings & Mehler

(57) ABSTRACT

A pet watering system which includes a refillable reservoir for holding water. A base is provided that holds the reservoir and receives water therefrom. Secured to the front of the base is a bowl which receives water from the base. A pump circulates water between the base and the bowl. A well is associated with the base, into which water is received from the base before being circulated into the bowl.

6 Claims, 3 Drawing Sheets

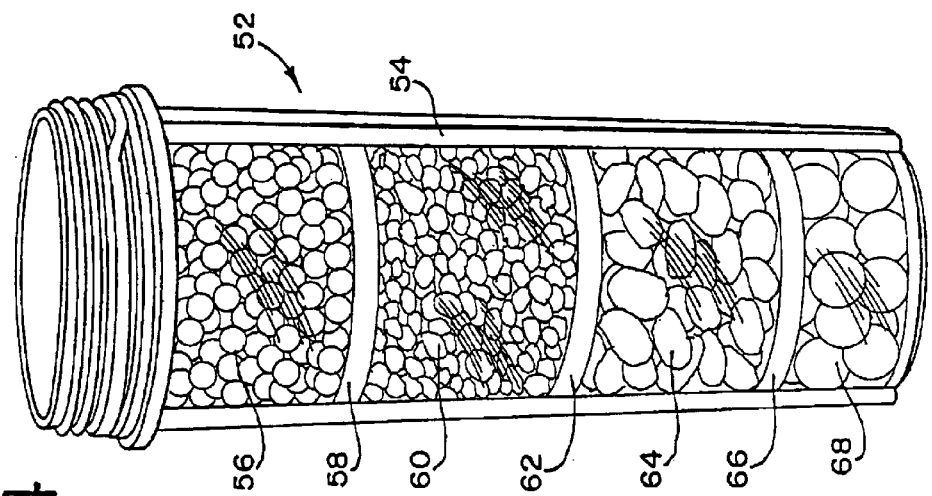
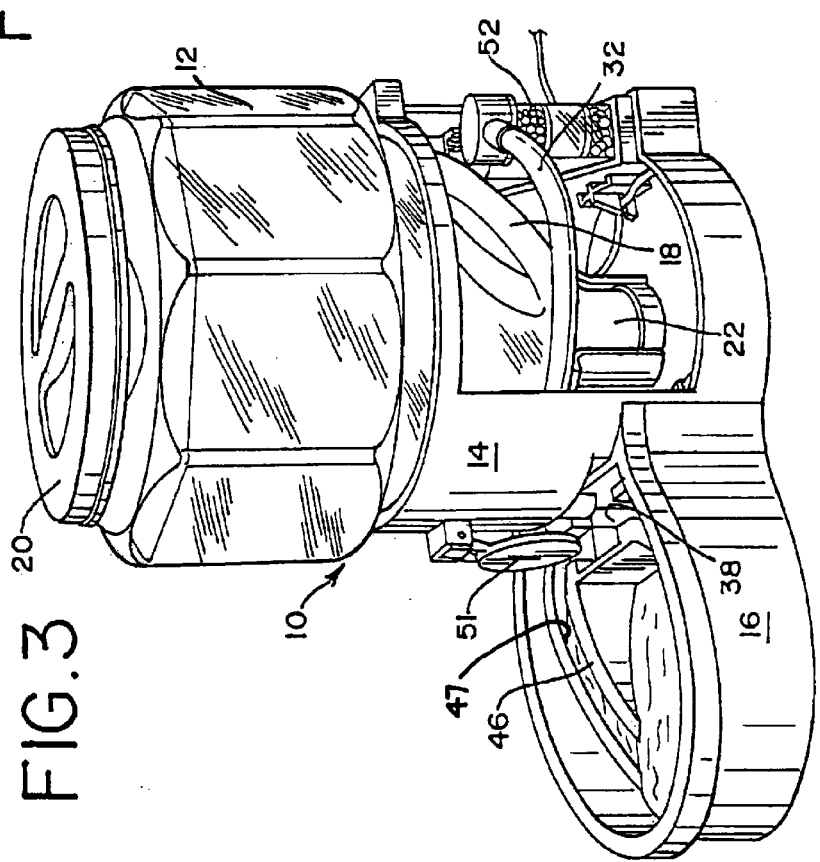

AUTOMATIC PET WATERER

CROSS-REFERENCE

This application claims the benefit of the filing date of provisional application Ser. No. 60/420,962, filed Oct. 24, 2002.

BACKGROUND OF THE INVENTION

It is believed, by observation, that household pets, namely dogs and cats, have a preference for drinking running water. This is possibly due to some instinctual understanding that running water is more likely to be fresher and cleaner than standing water and, thus, potable. As a consequence, pet watering systems have been developed which provide for the circulation of water in a free-falling stream. See, e.g., U.S. Pat. Nos. 5,842,437 and 5,799,609, as well as the "Discussion of Prior Art" contained therein, which describes a variety of different types of pet watering systems.

By way of the present invention, an improved pet watering system is provided that is simple to use, less likely to result in spillage, is adaptable to permit the volume of water associated with the system to be varied (thus accommodating differing needs of pets of various sizes and the duration of time over which the pet owner may be away), and aerates the water circulated therethrough.

SUMMARY OF THE INVENTION

These objects, as well as others that will become apparent upon reference to the following detailed description and accompanying specification, are provided by a pet watering system which includes a refillable reservoir for holding water. A base is provided that holds the reservoir and receives water therefrom. Secured to the front of the base is a bowl which receives water from the base. A pump circulates water between the base and the bowl. A well is associated with the base, into which water is received from the base before being circulated into the bowl.

In another aspect of the invention, the bowl includes an inclined ledge, the upper end of the ledge being adjacent the lip or upper end of the well and extending downwardly therefrom into the bowl. Thus, water flowing out of the well is carried downwardly on the inclined ledge into the bowl. The flowing water also serves to entrain contaminants the pet may bring to the water bowl after eating. Preferably, the pet waterer includes two inclined ledges which extend in opposite directions from the well along the interior wall of the bowl. In order to insure that the water flows down the ledges, rather than directly to the interior of the bowl, the ledges include a recessed channel to help direct water.

In other aspects of the invention, the pump includes an air intake that aerates the water pumped thereby, and the reservoir is removable from the base and includes a opposed handled that facilitate removal, refilling, and replacing the reservoir.

BRIEF DESCRIPTION OF THE DRAWINGS

FIG. 3 is a perspective view of an alternative embodiment of the automatic pet waterer according to the present invention with portions broken away to show detail.

FIG. 4 is a perspective view of the filter cartridge used in the embodiment of FIG. 3, with a portion broken away to show detail.

DETAILED DESCRIPTION

Figure 1:
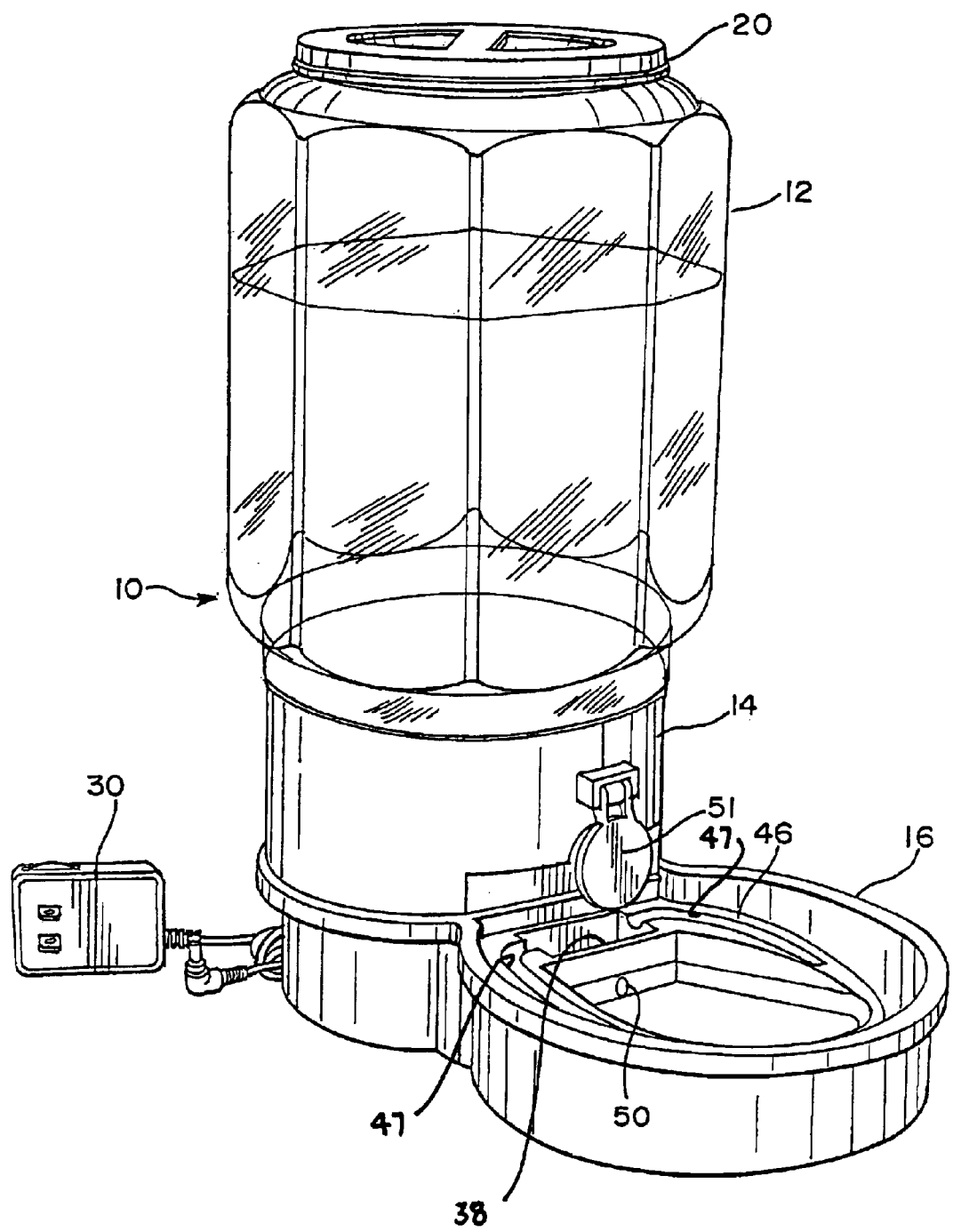
FIG. 1 is a perspective view of an automatic pet waterer according to the present invention.

Turning to FIG. 1, there is seen a perspective view of an automatic pet watering system, generally designated 10, embodying the present invention. The pet waterer 10 includes a refillable reservoir or bottle 12 that nests in base member 14, with the base member 14 having a bowl 16 attached thereto from which the pet drinks the water circulated by the watering system 10.

The bottle 12 may be of different volumes, depending upon the amount of water it is contemplated that the pet will consume until refilling of the bottle 12 by the pet owner. The bottle 12 includes two handles 18, 20 at its opposite ends, and a neck 22 having an opening through which water enters the bottle 12 during refilling or exits the bottle 12 when it is seated on the base 14. To this end, neck 22 includes an external screw thread for removably receiving a threaded cap that is removed for refilling the bottle 12 and then reattached to the bottle. The cap includes an integral check valve 24 that is spring-biased to its closed position so that water is prevented from exiting the bottle 12 until it is properly seated on the base 14. To this end, the bottom wall of the base 14 includes a post 26 that, when the bottle 12 is properly seated on the base 14, unseats the check valve 24 to allow water to flow out of the bottle 12 and into the base 14.

The handle 18, which attaches to the bottle neck 22, facilitates holding the bottle while it is being refilled. Handle 20 facilitates holding the bottle 12 when it is inverted so that it can be either seated on or removed from the base 14. As illustrated, the handle 20 is made separately from the barrel portion of the bottle 12 of a stronger plastic and is secured to the bottle 12 by, e.g., screw threads (as shown), glue, ultrasonic welding, etc. Alternatively the handle 20 can be molded with the bottle.

The water is circulated from the interior of the base 14 to the bowl 16 by means of an electric, continuously-operating pump 28 mounted to the bottom wall of the base 14. The wiring to connect the pump 28 to a power supply (see the D.C. converter 30 in FIG. 1) connects to a boss 31 secured to the side wall of the base 14. Alternatively, the pump 28 could be powered by a 110 V AC motor, thus not requiring a DC converter. Water is drawn through a pump water intake. A pre-filter may be provided for the pump water intake. The pre-filter may simply be in the form of a screen-like barrier supported by the base in front of the pump intake. The pre-filter could be either disposable or reusable. The bottom wall of the base 14 is sloped to direct the water toward the pump intake. The water is first circulated out of the pump 28 through a tubing 32, connecting the pump out flow to a replaceable box filter 34. In keeping with another aspect of the invention, the pump 28 also includes an air intake to aerate the water pumped therethrough.

The filtered water flows from the filter 34 through a generally U-shaped channel 36 coextensive with the side wall of the base that has a slight slope so that the water flows downwardly from the filter output toward the bowl 16 that forms part of the base 14. The channel 36 terminates at the front of the waterer 10 adjacent the bowl 16 and permits the water to drop down into a well structure 38 on the interior of the base 14 before it flows into the bowl 16. The well 38 reduces the velocity of the circulating water and, consequently, reduces the likelihood of splashing as the water is introduced into the bowl 16.

The bowl 16 is preferably manufactured separately from the base 14 and includes one or more threaded posts 40 which facilitate attachment to the base 14 by a complimentary nut 42. In keeping with the invention, the interior of the bowl 16 is configured to allow the water to flow out of the well 38, away from the base 14, and into the central open area of the bowl 16. The water then flows back towards—and into—the base 14, where it is directed through the pre-filter to the pump intake and recirculated by the pump 28. The circulation path is generally shown in FIG. 2 by the arrows 44.

In keeping with another aspect of the invention, the bowl 16 is formed with an interior ledge 46 that slopes downwardly from the well 38 toward the opposite side of the bowl 16. The water flows out of well 38 and down the ledge 46, over the inner edge of the ledge 46, and into the center of the bowl 16. Preferably, each interior ledge has a central recess or channel 47 formed therein to ensure that the circulated water flows down the ledge before emptying into the bowl.

Figure 2:
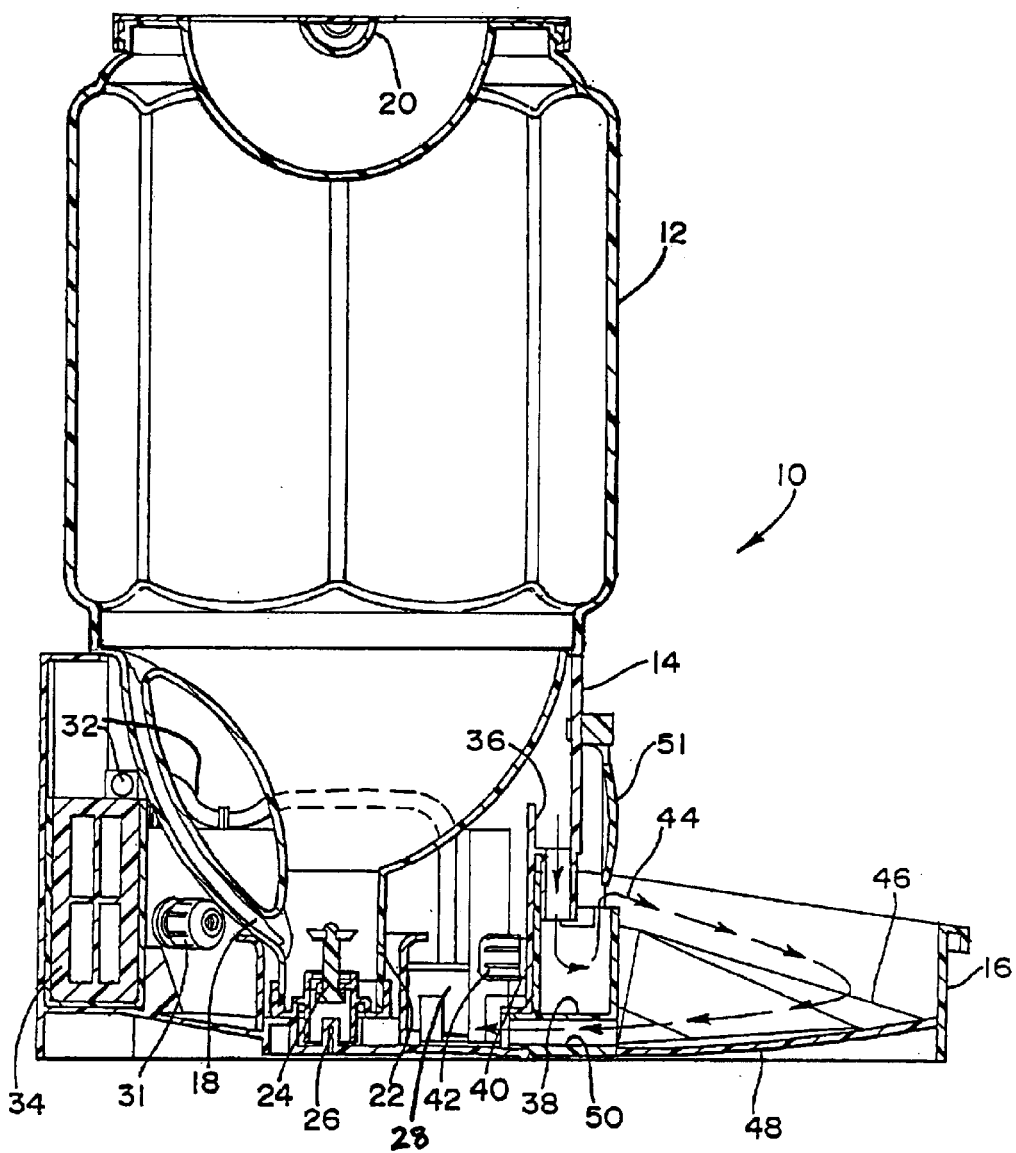
FIG. 2 is a vertical cross-sectional view of the automatic pet waterer, with certain components omitted for clarity.

As best seen in FIG. 2, the bottom 48 of the bowl 16 is sloped downwardly toward the base 14 so that the water in the bowl is directed to a fluid passageway 50 interconnecting the base 14 and the bowl 16. The fluid passageway 50 directs the water to the pump inlet for recirculation through watering system. The height of the passageway 50 is such that a portion of the passageway extends above the water level, thus permitting any particulates floating on the surface of the water in the bowl 16 to be circulated to the interior of the base 14 and removed by the pre-filter for the pump intake. Access to the well 38 from the exterior of the base 14 by the pets that will use the watering system 10 is deterred by a hinged cover 51 secured to the base 14.

In the preferred embodiment of the waterer 10, the filter 34 comprises a replaceable multi-stage filter cartridge 52, best seen in FIGS. 3 and 4. The filter cartridge 52 includes a cylindrical housing 54 and eight filter layers comprising, from top to bottom, a mesh filter (not shown), a small ceramic ball filter element 56, and second mesh filter 58, an activated carbon filter element 60, a third mesh filter 62, a stone filter element 64, a fourth mesh filter 66, and a large ceramic ball filter element 68.

Each of the mesh filters preferably comprise a 1 mm square stainless steel or plastic/nylon mesh for trapping solids, although other mesh sizes may be appropriate. The ceramic ball filter element 56 consists of small ceramic balls for filtering out heavy metals from the water. This layer 56 constitutes the primary filter, which enables the water to become more bioactive and, hence, precipitate dissolved solids when passing through the activated carbon layer 60. In the preferred embodiment, the ceramic balls comprise, by wt. %: $SiO_2$ 58.67; $CaO$ 22.92; $Al_2O_3$ 9.85; $Na_2O$ 2.76; $K_2O$ 2.67; $Fe_2O_3$ 1.37; sintered iron 0.84; $ZnO$ 0.28; and $TiO_2$ 0.18.

The activated carbon filter element 60 comprises activated carbon with silver ions to enable the reduction of chlorine and to remove any odors. The activated carbon also enables the precipitation of dissolved solids.

The stone filter element 64 traps the precipitated solids so that the water is clean when exiting this filter element.

The large ceramic ball filter element 68 is a secondary layer to further make the water more bioactive after having passed through the activated carbon layer 60 and stone filter 64. The increased bioactivity, along with the air pumped into the water by the air intake on the pump, increases the oxygen content of the water, thus making it better tasting and healthier. This filter layer also reduces the formation of algae and keeps the water fresh. The composition of the large ceramic balls is preferably the same as that of the small ceramic balls.

Thus, an improved pet waterer has been provided that meets all the objects of the present invention. While the invention has been described in terms of certain preferred embodiments, there is no intent to limit it to the same. Instead, the scope of the invention is to be defined by the following claims.

What is claimed is:

1. A pet watering system comprising:
   a refillable reservoir for holding water;
   a base for holding the reservoir and receiving water there from;
   a bowl secured to the base for receiving water from the base; wherein the bowl is defined by a wall having an interior side and the bowl includes two inclined ledges having upper ends adjacent the well and extending in an opposite directions away from the well along the interior of the wall of the bowl, so that water flowing out of the well flows downwardly on the two inclined ledges into the bowl
   a pump for circulating water between the base and the bowl;
   a filter connected to the pump for receiving pressurized water therefrom; and
   a well associated with the base into which water is received from the filter before being circulated into the bowl.

2. The pet watering system of claim 1 wherein the bowl includes an inclined ledge having an upper end adjacent the well and extending downwardly into the bowl, so that water flowing out of the well flows downwardly on the inclined ledge into the bowl.

3. The pet waterer of claim 1 wherein each ledge includes a recessed channel.

4. The pet waterer of claim 1 wherein the pump includes an air intake for aerating the water pumped thereby.

5. The pet waterer of claim 1 wherein the reservoir is removable from the base.

6. The pet waterer of claim 5 wherein the reservoir has opposite ends and a handle associated with each end to facilitate removal from the base, refilling the reservoir, and reinserting the reservoir into the base.

\* \* \* \* \*